United States Patent [19]
Conrad

[11] Patent Number: 5,130,003
[45] Date of Patent: Jul. 14, 1992

[54] METHOD OF POWERING CORONA DISCHARGE IN OZONE GENERATORS

[76] Inventor: Richard H. Conrad, 950 Idylberry Rd., San Rafael, Calif. 94903

[21] Appl. No.: 538,205

[22] Filed: Jun. 14, 1990

[51] Int. Cl.$^5$ ............................................. C01B 13/10
[52] U.S. Cl. ................................. 204/176; 422/186.16
[58] Field of Search ................ 361/235, 213; 323/903; 250/324; 204/176, DIG. 9; 422/186.15, 186.16, 186.21

[56] References Cited

U.S. PATENT DOCUMENTS

| | | | |
|---|---|---|---|
| Re. 30,320 | 7/1980 | Lowther | 204/176 |
| 1,514,964 | 11/1924 | Hartman | 204/176 |
| 2,615,176 | 10/1952 | Thorp et al. | 204/176 |
| 3,205,162 | 9/1965 | Maclean | 204/176 |
| 3,736,493 | 5/1973 | Rosenthal et al. | 250/324 |
| 3,813,547 | 5/1974 | Silverberg | 250/324 |
| 4,002,921 | 1/1977 | Lowther | 307/43 |
| 4,016,060 | 4/1977 | Lowther | 204/176 |
| 4,283,291 | 8/1981 | Lowther | 422/186.15 |
| 4,314,321 | 2/1982 | Galliker | 363/10 |
| 4,495,043 | 1/1985 | Marets | 204/176 |
| 4,680,694 | 7/1987 | Huynh et al. | 422/186.16 |

*Primary Examiner*—William H. Beha, Jr.
*Attorney, Agent, or Firm*—Larry D. Johnson

[57] ABSTRACT

A method of supplying electrical power to and controlling corona discharge cells used for the generation of ozone employs a single-cycle discontinuous waveform which is characterized by a fixed pulse width and a variable repetition rate. Discrete bipolar pulses are composed of a pair of unipolar pulses of opposite polarity. The bipolar pulse repetition rate is varied to control the average corona power, providing an infinite turndown of ozone output. When powering discharge cells which are asymmetric in their response to pulse polarity, such as those containing a dielectric coated with a conducting surface as a first electrode and a metal as a second electrode, the present invention configures the first pulse of each pair to make the dielectric electrode electronically negative with respect to the metal electrode. This polarity sequence produces a more stable corona and far less electrical noise. Furthermore, to decrease acoustic and mechanical resonances and fatigue to system components and to the human ear, this invention broadens the frequency distribution of the pulse repetition rate by repetitively sweeping or randomly jittering the intervals between bipolar pulses.

28 Claims, 6 Drawing Sheets

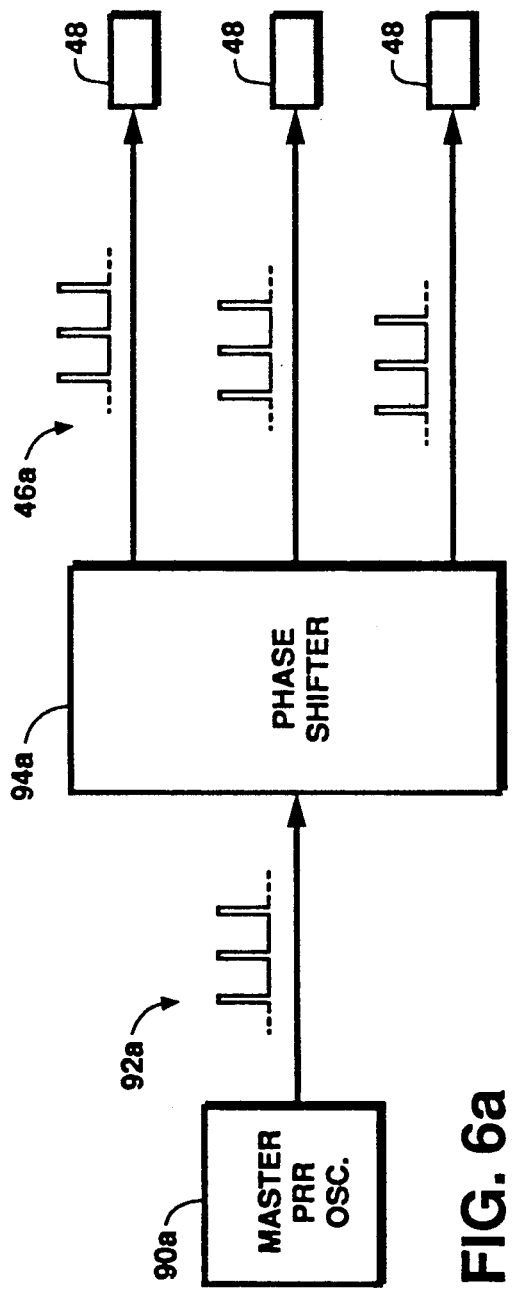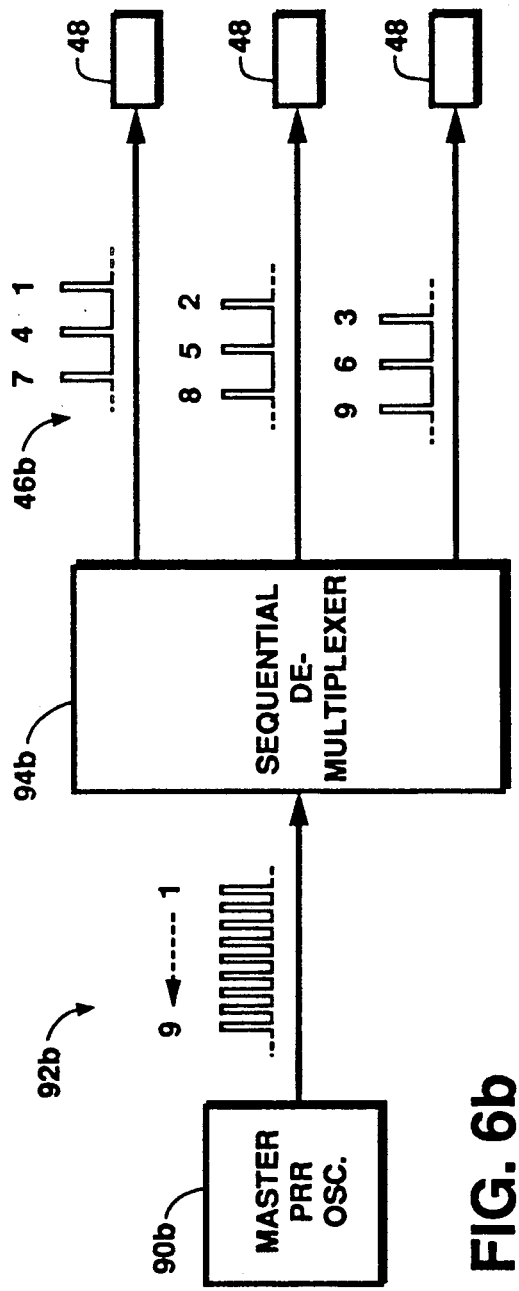

METHOD OF POWERING CORONA DISCHARGE IN OZONE GENERATORS

BACKGROUND OF THE INVENTION

1. Field of the Invention

This invention relates generally to methods and apparatus for supplying electrical power to ozone generators, and more specifically to a method utilizing discontinuous waveforms composed of pulse pairs for powering corona discharge cells.

2. Description of the Prior Art

Ozone is a very powerful gaseous reactant, and its use has been well established for many years in a wide range of industrial applications. Recently its value in all types of water purification applications has been coming to the fore because of its ability to act as a powerful oxidant, microflocculant and disinfectant without producing toxic by-products. The most widely used method of generating ozone utilizes a corona discharge cell in which dry air or oxygen flows through a narrow gap or annulus bordered on one side by a cooled stainless steel ground electrode and on the other by a dielectric electrode surfaced (on the side which faces away from the gap) with an electrical conductor. An alternating current of high voltage is connected to the dielectric electrode, producing a high-voltage field across the gap which results in a corona discharge. This discharge, which is also known as a "silent discharge" or "cold plasma discharge" and is actually composed of many transient microdischarges, converts a percentage of the gas to ozone. The dielectric is necessary to prevent the microdischarges from becoming arcs, which would rapidly destroy the electrode surfaces.

The high voltage necessary to drive the corona discharge is produced by a power supply which includes a transformer capable of boosting low voltage AC to a high voltage, usually between 5 and 25 Kilovolts. Minimizing the voltage at which an ozone generator operates is of very great importance, for this not only minimizes the high-voltage stress on all components for longer life, but is also safer, minimizes arcing and external corona, and decreases the cost of the transformer. At fixed voltage the quantity of ozone generated is roughly proportional to the continuous wave AC frequency or the pulse repetition rate until an upper frequency limit is reached. The practical upper limit for efficient ozone generation usually lies between 600 and 2500 Hz, and depends on corona cell geometry, properties of the dielectric used and cooling efficiency. (At least two factors limit the highest ozone concentrations efficiently attainable: at higher concentrations the rate of ozone formation decreases, becoming self-limiting, with the limit being lowered by higher temperatures; and at higher temperatures the rate of ozone destruction increases.) Ideally the corona is operated at the lowest voltage at which the corona is stable and homogeneous, and the average output power and therefore the amount of ozone generated is controlled by adjusting the frequency rather than the voltage.

Some ozone generators employ continuous wave AC line frequency (50 to 180 Hz) to power their corona. This frequency is too low to produce appreciable ozone unless the corona voltage is quite elevated. Therefore, in order to be able to run at a lower voltage, many modern generators operate at "medium" or "high" continuous wave frequencies, typically 600 Hz and 2 KHz respectively. They most often utilize continuous wave AC, and to achieve a range of ozone output or a "turndown ratio" they must be able to decrease their frequency. To achieve the desired turndown ratio of 10:1, a generator running at 2 KHz at full power must be able to lower its frequency to 200 Hz. One disadvantage of running at low frequencies is that the corona is much rougher, and a further disadvantage concerns the high-voltage transformer. The high-voltage transformer is one of the most critical components of the whole system. Each transformer is designed for a minimum frequency limit, and if it is operated below that limit, it will saturate and short-circuit. The lower the design frequency, the larger and more expensive is the transformer. Thus the transformer in all conventional continuous wave prior art, both low and high frequency, must be designed for operation at 200 Hz or less, with the great sacrifice of increased size and cost.

MacLean (U.S. Pat. No. 3,205,162) and Marets (U.S. Pat. No. 4,495,043) attempt to circumvent this problem by utilizing wave trains of higher frequency and lower average duty cycle where they can reduce power by increasing the dead time between trains. One disadvantage of wave or pulse trains is that there is no dead time between the individual cycles or pulses of the train for the dead time jittering (dithering) or sweeping of the present invention, and another disadvantage is that having a negative pulse follow closely on the heels of the preceding positive pulse can result in up to a 25% decrease in ozone generation efficiency (compared with the method of the present invention) because of more local heating and ion/space-charge buildup. Collins (U.S. Pat. No. 4,869,881) uses discrete single-cycle waveforms, but neither this nor the previously mentioned patents differentiate the sequence of pulse polarities, and disregarding this factor in corona cells with asymmetrical electrode properties can result in a much rougher, less stable corona with higher current spikes, producing greater EMI (electromagnetic interference) and requiring a higher operating voltage (as will be discussed in detail below). Lowther (U.S. Pat. No. 4,016,060) employs very high frequency pulses, but because these are individual pulses of only one polarity and of extremely short duration (less than 2 microseconds), they fall outside the area of this invention and are highly impractical to implement.

Prior art ozone generators power their corona cells with a waveform of narrow frequency distribution. Alternating or pulsed electrical power at a particular frequency or at a number of discrete frequencies emits electromagnetically generated acoustic and mechanical vibrations at these frequencies, which can include harmonics and sub-harmonics of the driving frequencies. In addition to resulting in audible sounds such as hum or (often penetrating) whine, they can set up powerful resonances, particularly in inductors, high voltage transformers and glass or ceramic ozone cell dielectrics. These resonances are potentially damaging to equipment and to the ear. Even if no parts of the equipment happen to resonate at the driving frequency, continuous driving at a single frequency can eventually cause fatigue in these components, especially in glass dielectrics, contributing to their breakage. In particular, the alternating high voltage induces a significant mechanical vibration within corona cells due to alternating electrostatic attraction and relaxation between the electrodes. Since large industrial ozone generators utilize glass dielectric electrodes and often contain hundreds of glass dielectric tubes, it is of great importance to be able to increase dielectric longevity. Furthermore, it is probable that resonances are set up in the gas volume of the corona discharge itself which cause a high concentration of corona microdischarges at particular points, resulting in more erosion and stress to the dielectric, and secondarily, corona flickering or other instabilities which may affect the efficiency of ozone generation. The method of the present invention greatly diminishes these problems by broadening the frequency distribution of the pulse repetition rate without decreasing the efficiency of ozone generation.

SUMMARY OF THE INVENTION

The method of the present invention comprises a unique single-cycle discontinuous waveform for supplying and controlling the power to corona discharge ozone generators which provides the following features and benefits:

1) Infinite turndown from full power while enabling the use of smaller, less expensive high-voltage transformers;

2) A broadened frequency distribution of the repetition rate which avoids concentrating all the driving energy at one frequency and thereby greatly lessens electromechanical and sonic resonances which otherwise shorten component life and fatigue the ear; and 3) A smoother, more stable corona which ignites and operates at a lower voltage, reduces EMI, and generates ozone more efficiently.

The waveform which is used to drive the high-voltage transformer utilizes discrete bipolar pulses each composed of a pair of adjacent unipolar pulses of opposite polarity and equal area. The bipolar pulses are separated from each other by a dead time interval. This dead time interval is varied to change the repetition rate of the bipolar pulses which in turn controls ozone output, whereas the bipolar pulse width and (therefore the operational frequency of the transformer) is held constant.

An optional feature of the present invention is that the dead time interval between bipolar pulses can be randomly (or pseudo-randomly) jittered or repetitively swept around an average value. This jittering or sweeping broadens the frequency distribution of the bipolar pulse repetition rate, spreading it over a wide range of frequencies, therefore avoiding the detrimental effects of acoustic and mechanical resonance and fatigue.

Since the present method utilizes discrete bipolar pulses separated by a dead time interval, it creates a choice of polarity sequence, i.e., whether to have the positive pulse first or the negative pulse first. I have discovered that this choice is extremely important in cases where the ozone generating electrodes behave asymmetrically, that is, when they are sensitive to polarity. Most ozone today is generated in an asymmetric type of cell where one electrode has a glass surface in contact with the corona and the other electrode is a stainless steel surface in contact with the corona. (Using a glass dielectric on both electrode surfaces would increase complexity and cost, necessitate driving the corona cell with a higher voltage and would make heat removal more difficult.) I have found that the typical glass/stainless corona cell is significantly polarity sensitive: discrete bipolar pulses delivering an initially negative polarity to the dielectric electrode provide a much smoother, quieter corona with less EMI than prior art continuous wave power, and an initially positive polarity results in unstable voltage spiking and severe EMI.

In addition to the usual reasons why EMI is undesirable, it can be a particularly serious problem in the switching type of power supply commonly used for ozone generation, since EMI is capable of triggering spurious gating pulses which can cause the transistor switches to burn out. This very likely has been the cause of failure in a number of ozone generator supply designs. The absence of high-voltage spikes in the smoother corona which results when the initial polarity applied to the dielectric electrode is negative also extends the life of the high-voltage transformer and increases the reliability of the corona cell dielectric.

The present invention also includes an optional provision for driving two or more supplies from a master pulse repetition rate generator whose output has either an unbroadened or a broadened frequency distribution and provides triggering pulses to two or more switch-gating pulse generating circuits through phase-shifting or sequential de-multiplexing circuitry. This circuitry splits the output of the master pulse repetition rate generator into two or more outputs and includes an anti-coincidence mechanism which prevents the initiation of bipolar pulses in more than one switch-gating pulse generator at a time. This distributes the current spikes on the AC power line over time, thus preventing superimposed current spikes and lowering the instantaneous current.

BRIEF DESCRIPTION OF THE DRAWINGS

FIGS. 6a and 6b illustrate the use of a single master pulse repetition rate generator to control two or more supplies.

DETAILED DESCRIPTION OF A PREFERRED EMBODIMENT DEFINITIONS

"Negative pulse" or "negative polarity" signifies that part of the waveform which makes the dielectric electrode electronically negative with respect to the metal electrode, or equivalently, makes the metal electrode electronically positive with respect to the dielectric electrode.

"Positive pulse" or "positive polarity" signifies that part of the waveform which makes the dielectric electrode electronically positive with respect to the metal electrode, or equivalently, makes the metal electrode electronically negative with respect to the dielectric electrode.

Figure 1A:
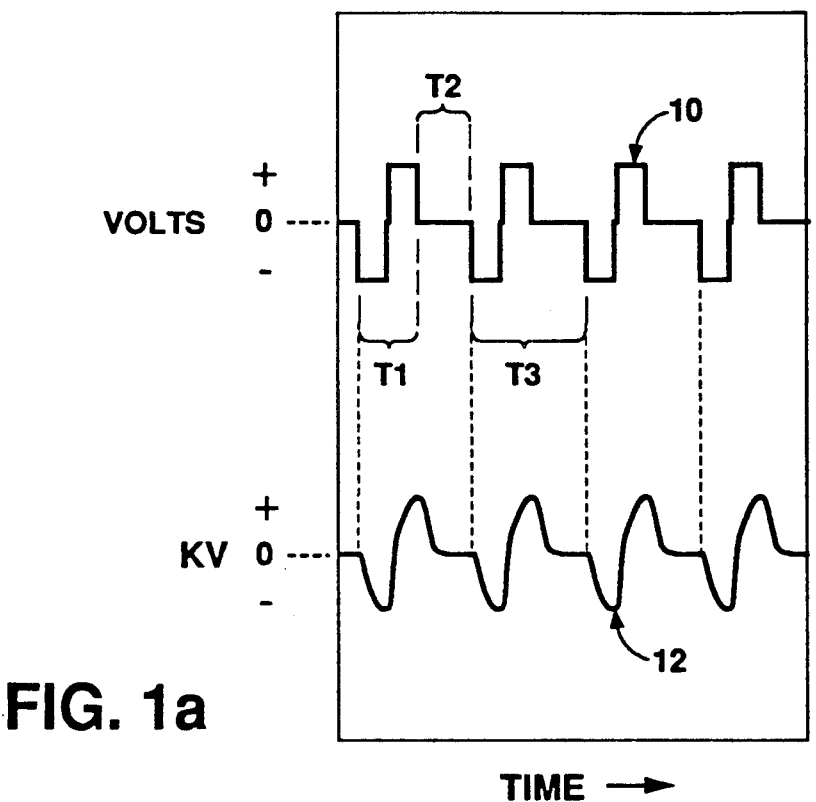
FIGS. 1a and 1b illustrate preferred single-cycle discontinuous waveforms of the method of this invention, with the waveforms of FIG. 1a being of narrow frequency distribution, and the waveforms of FIG. 1b being of broadened frequency distribution.
Figure 1B:
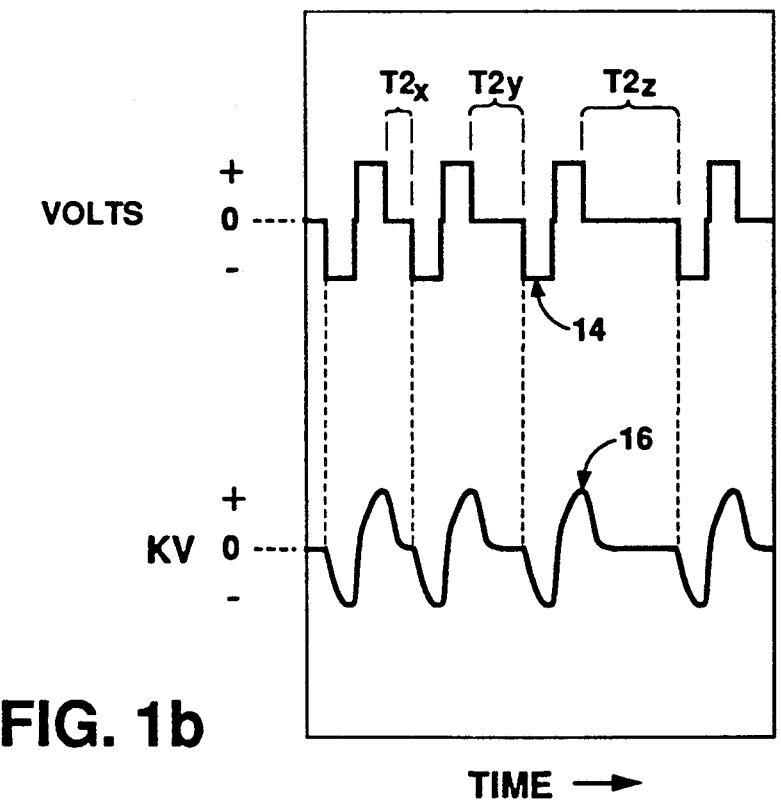

FIGS. 1a and 1b illustrate preferred single-cycle discontinuous waveforms of the method of this invention. These waveforms are characterized by discrete bipolar pulses of fixed bipolar pulse width (BPW) and variable repetition rate (PRR). In waveform 10 of FIG. 1a, which is the waveform which drives the input of a high-voltage transformer, each bipolar pulse has fixed width T1 (the BPW) and is composed of a pair of adjacent unipolar pulses of opposite polarity and equal area. Each bipolar pulse is separated from the next by a variable dead time or time interval T2 which may be varied to adjust T3, the period of the bipolar pulse repetition rate (PRR) which controls average corona power. Optionally there can be a relatively small fixed space of approximately 0.5 to 50 microseconds between adjacent unipolar pulses. The number of seconds in the volt-second calculation for transformer design is equal to BPW/2. Waveform 12 in FIG. 1a is the high-voltage waveform as fed into the corona cell from the output of the high-voltage transformer. The shape of waveform 12 is modified from the transformer-driving waveform 10 mainly by the inductance, impedance, and capacitance interactions of the transformer and the corona cell.

During normal corona cell operation with any type of driving waveform, the corona itself is discontinuous, the corona stopping each time the high-voltage reaches its peak and restarting anew after the high-voltage crosses zero. Therefore it is not necessary to use a continuous wave (100% duty cycle), and to achieve power reduction it is advantageous to reduce only the pulse repetition rate, keeping the bipolar pulse width constant. Therefore the method of this invention utilizes two separate frequencies: 1) a fixed "TOF", or Transformer Operational Frequency, which equals 1/T1 or 1/BPW where BPW is the Bipolar Pulse Width or the period of time from the beginning of the first unipolar pulse of a bipolar pulse to the end of the second unipolar pulse of that same bipolar pulse; and 2) a variable "PRR", or Pulse Repetition Rate (the bipolar pulse repetition frequency). The PRR is the number of times per second that the bipolar pulse occurs, which is equal to 1/T3 or 1/[the time interval between the beginning of one bipolar pulse and the beginning of the next bipolar pulse]. The PRR may be varied between zero and the TOF, but more typically between 30 and 3000 Hz. In the normal application of the present invention the BPW (and therefore TOF) remains fixed within each particular ozone generator system (each system being composed basically of power supply, high-voltage transformer(s), and corona discharge cell(s)), although it may be adjusted over a range whose absolute lower limit is set by saturation of the transformer core (the calculation for transformer design being based partly on BPW/2). Typically the transformer operational frequency TOF would lie somewhere between 2 KHz and 5 KHz, although it could conceivably range between 500 Hz and 50 KHz or more. Thus the typical BPW would be between 500 and 200 microseconds, but it could range between 2000 and 20 microseconds. At full power (maximum PRR), PRR approaches TOF and less dead time (T2) remains between one pulse pair and the next. To decrease the power and therefore the ozone output, PRR is decreased, which increases only the dead time T2 between bipolar pulses and does not affect the TOF or the bipolar waveform. Thus, in the method of this invention, the TOF can be higher than the maximum PRR because of the nature of the single-cycle discontinuous bipolar waveform.

In prior art ozone power supplies which use a continuous waveform of 100% duty cycle and employ the technique of lowering their continuous wave frequency to achieve a reduction in power, the TOF has to be equal to the minimum PRR and therefore the size of the transformer must be greatly increased. This means that in two equivalent ozone generation systems with a full-power PRR of 2 KHz, both capable of achieving a ten-to-one turndown ratio, the prior art would need a transformer capable of 200 Hz, whereas using the discontinuous method of the present invention enables the use of a transformer designed for 4 KHz or higher. This difference is very important because a 200 Hz transformer would be approximately 8 times the weight and cost of a 4 KHz transformer of the same ozone generating capacity. In addition, at the higher TOF the corona is smoother and more stable, with fewer voltage and current spikes.

Due to the capacitative nature of the load (the corona cell) on the power supply, when the pulses are shorter (i.e., higher TOF) the peak current is higher, resulting in approximately the same area or time-integrated power being delivered to the ozone cell as with a lower TOF, and as a result the amount of ozone generated is relatively insensitive to the TOF itself. We are thus free to choose the TOF based on transformer considerations, duty cycle considerations, smoothness of corona, and allowing enough room between pulses for broadening the frequency distribution of the pulse repetition rate around an average value. The considerations for choosing the upper limit of TOF are the transformer core material, decreased duty cycle resulting in more current peaking and therefore more $I^2R$ heating in the transformer, and increased stress on the high voltage insulation.

An optional feature of the present invention, as illustrated by the waveforms of FIG. 1b, is that the dead time T2 between bipolar pulses can be randomly (or pseudo-randomly) jittered or repetitively swept around an average value. Waveform 14 in FIG. 1b is a jittered transformer-driving waveform showing dead times $T2_x$, $T2_y$, and $T2_z$, and waveform 16 is the correspondingly jittered high-voltage waveform as fed into the corona cell from the output of the high-voltage transformer. The jittering or sweeping broadens the frequency distribution of the PRR, spreading it over a wide range of frequencies, therefore avoiding the detrimental effects of acoustic and mechanical resonances and fatigue. Further elaboration of this feature is included with the discussion of FIG. 5 infra.

Figure 2:
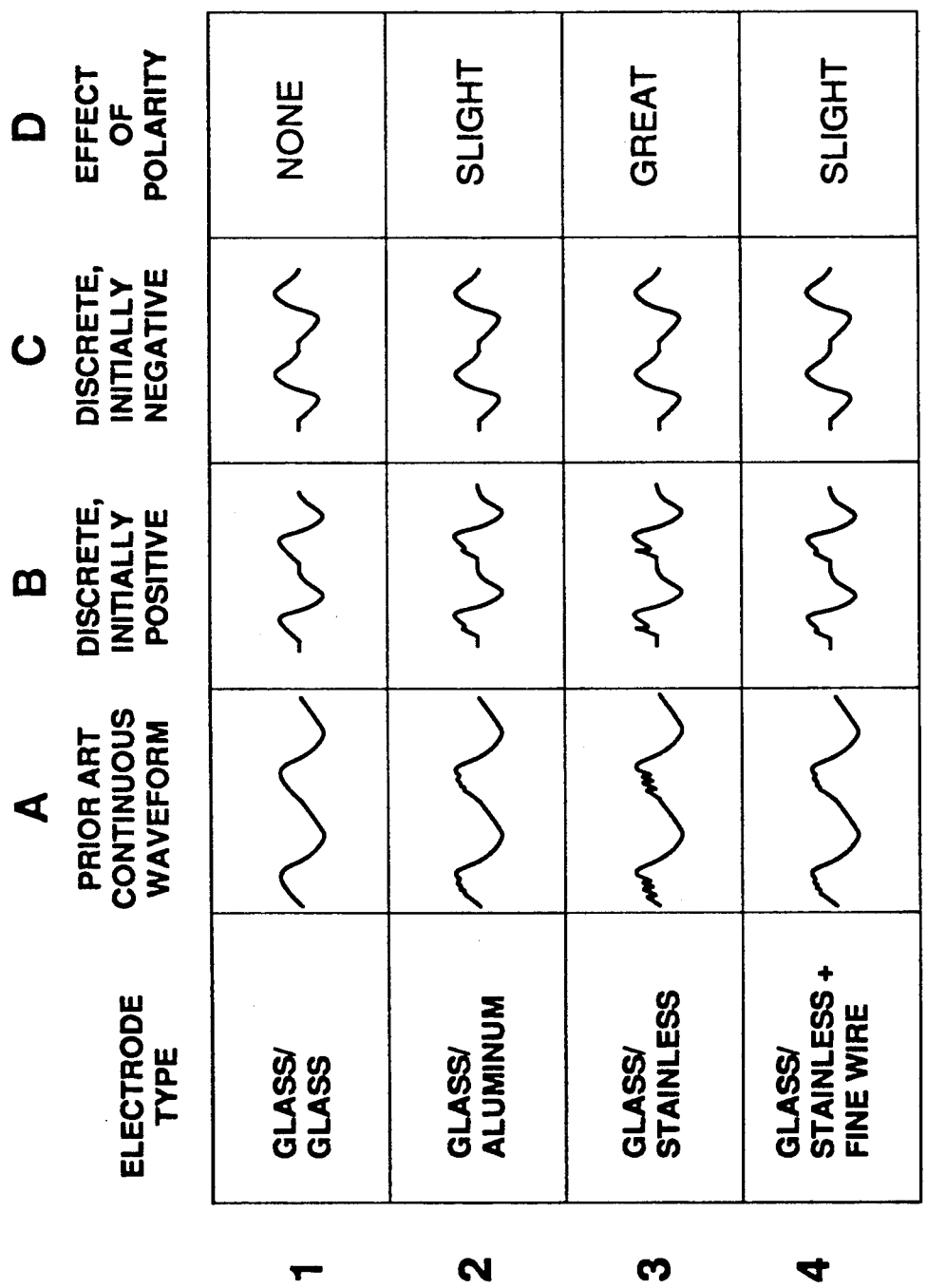
FIG. 2 is a chart illustrating symmetrical and asymmetrical high-voltage waveforms occurring in a variety of corona cell electrode configurations.

FIG. 2 is a chart illustrating symmetrical and asymmetrical high-voltage waveforms occurring when a variety of corona cell electrode configurations are powered by the high-voltage output of a transformer. This chart illustrates waveforms generated by a two-dielectric cell (row 1, glass/glass), a dielectric/aluminum electrode cell (row 2, glass/aluminum), a dielectric/stainless steel electrode cell (row 3, glass/stainless steel), and an experimental dielectric/stainless steel electrode cell with the stainless steel electrode wrapped with fine stainless steel wire (row 4, glass/stainless steel plus fine wire). Column A displays prior art continuous waveforms, column B illustrates single cycle discontinuous waveforms resulting when the initial polarity to the dielectric electrode is positive, column C displays waveforms of the present invention which are single cycle discontinuous waveforms supplying an initially negative polarity to the dielectric electrode, and column D describes the degree of effect of initial polarity on the waveforms in each row.

FIG. 2 shows that when the corona cell electrodes are glass/glass the continuous waveform (row 1, column A) is symmetrical and the positive and negative high-voltage waveforms (row 1, columns B and C) are mirror images of each other, as would be expected because both electrodes are similar. When the electrodes are glass/aluminum (row 2) a very slight asymmetry occurs in the waveforms of columns A and B in the form of more corona roughness while the glass electrode is positive. When stainless steel (row 3) is substituted for aluminum, the asymmetrical roughness increases considerably in columns A and B. When the bipolar waveforms of the present invention are initially negative to the dielectric (column C), they remain consistently smooth for all electrode configurations. With a stainless steel electrode and the bipolar waveforms of the present invention, it makes a great deal of difference whether the initial polarity is negative or is positive, with the waveform becoming very rough when the initial polarity at the dielectric is positive. Thus the effective electron work-functions of corona ignition appear to be different for glass, aluminum, and stainless steel, with stainless steel being considerably more polarity sensitive than aluminum.

The vast majority of industrial and commercial ozone generators use a glass dielectric and employ stainless steel for the metal electrode (out of necessity to avoid corrosion). FIG. 2 shows that these glass/stainless cells are polarity sensitive when driven by prior art waveforms. I have found that this corona asymmetry occurs similarly with all three types of stainless steel tested, types 304, 316, and 321, using a dielectric of either glass or ceramic. In most ozone generators the stainless steel electrode serves as the electrical ground, and the voltage of the glass electrode swings alternately above and below ground. In continuous wave systems this asymmetry (row 3, column A) is noticeable in that the corona is much rougher (more irregular, more voltage and current noise) when the glass is positive, and smoother when it is negative. Note that when the glass electrode is positive, electrons would be emitted from the stainless steel electrode, and the accompanying roughness implies that this is more difficult than electron emission from the glass when the glass is negative. This roughness produces stress on the high voltage transformer and on the dielectric, probably causes more erosion of both electrodes, is audibly noisy, causes vibration which could shorten the life of glass dielectrics, and is accompanied by high levels of EMI. These effects become increasingly more pronounced as the concentration of ozone increases.

The following experiment was conducted to test my theory mentioned above that the effective electron work-function might be higher for the stainless steel electrode: a spiral of fine stainless steel wire was wrapped around the stainless steel electrode (which was actually tubular), and the resulting corona waveforms (row 4) were compared to the control without the spiral of wire (row 3). The fine wire was used in order to increase the non-homogeneity of the high-voltage field, therefore increasing the effective high voltage. This is equivalent to having a multiplicity of moderately sharp points on the surface of the stainless electrode, and would be expected to decrease the work-function of that surface. (The use of a fine wire or wire mesh or sharp points is not desirable in actual ozone generation practice because they produce many "hot spots" which considerably decrease the efficiency of ozone generation.) The resulting waveforms (row 4) are smoother and more symmetrical than columns A and B of row 3, and are almost identical to those produced by an aluminum electrode (row 2). This is an initial confirmation of the theory that the asymmetrical roughness is due to the effective electron work-function being higher for the stainless steel electrode.

Further confirmation of this theory is found when comparing the high-voltage corona of the single-cycle discontinuous waveforms of the present invention in row 3, columns B and C, where when the first unipolar pulse following a dead time makes the dielectric positive with respect to the metal electrode, in addition to displaying the roughness of the continuous waveforms described above, the corona is far less stable and requires a higher voltage to ignite than when the first pulse makes the dielectric negative (row 3, column C). When the microdischarges of these coronas were observed visually through a dielectric coated with a transparent electrode, it was found that the microdischarges looked entirely different when the positive pulse was first to the dielectric versus when the negative pulse was first: the microdischarges were larger and fewer with positive first to the glass (i.e., with negative first to the stainless steel), and much finer and more numerous with the negative first to the glass. Therefore, for the single-cycle discontinuous waveform of the method of the present invention, in corona cells where the electrodes behave asymmetrically, the polarity sequence of the unipolar pulses is chosen so that the first pulse to the dielectric is negative. With this waveform and polarity sequence (row 3, column C) each positive pulse follows closely enough after a negative pulse (more closely than in the prior art continuous waveforms because in the present invention the TOF is greater than the PRR) for there to be enough ions remaining to cause the positive corona ignite much more smoothly. I have found that a smooth restart with the dielectric positive requires that the positive pulse follows the extinction of a previous corona by no more than about 150 microseconds (where the width of the bipolar pulse pair is 400 us, and 1/400 us = 2.5 KHz). In most situations this requires that the TOF be at least 2.5 KHz (and at least 3.0 KHz at higher ozone concentrations). The majority of continuous waveform ozone generating systems cannot be run at this high a frequency because they would then draw too much power and would overheat (even if they could run at 2.5 KHz full power, they would have to lower their frequency in order to be able to achieve a turndown in ozone output). The negative-first single-cycle waveform of the present invention overcomes these problems by providing and maintaining the shorter delay between negative corona off and positive corona on necessary to produce smooth starts on the positive cycle, enables the use of a much smaller, less expensive transformer, and simultaneously makes it possible to turndown the power to any level desired by adjusting the PRR. In the method of the present invention, as the PRR is varied, all waveforms and voltages remain constant, whereas in prior art continuous wave methods the corona becomes rougher as the frequency is decreased (see FIG. 3, waveform 34), and the high-voltage level may change because the efficiency of the transformer varies with the continuous wave frequency. In addition, it is easier to design power supplies and transformers for a fixed TOF, and it is easier to control and monitor a repetition rate than a pulse width.

When the waveform of this invention, with the first pulse negative (row 3, column C), is used to drive the asymmetrical stainless steel and glass electrodes typical of the majority of ozone generators presently in use, a much smoother, quieter and more stable corona is obtained than with a continuous waveform (row 3, column A). Thus the waveform of the present invention results in the positive corona being as smooth as the negative, provides a corona that is easier to ignite initially, and allows stable operation at a lower voltage. Furthermore, this waveform uses up to 25% less power to generate the same amount of ozone when compared to prior art burst/train waveform modes, apparently because it does not have a negative pulse following as closely after a positive pulse as the prior art does. The reduced efficiency of the prior art which occurs when a negative pulse follows closely after a positive pulse is possibly due to the formation of a space charge which inhibits ozone formation. This problem does not occur in the method of the present invention as long as the duty cycle remains below 100%.

Figure 3A:
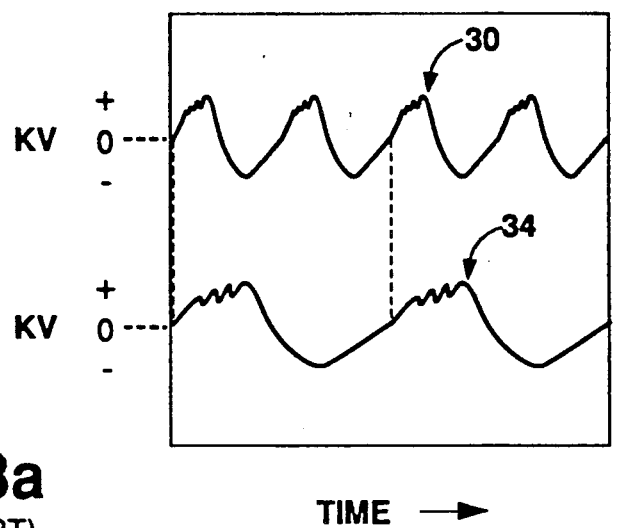
FIGS. 3a and 3b show a comparison of a prior art high-voltage continuous waveform and the high-voltage waveform of the present invention and illustrates the effect of a 50% power turndown on both waveforms.
Figure 3B:
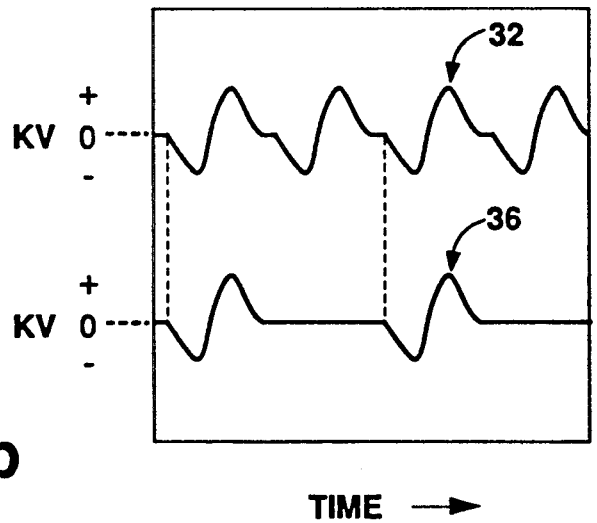

FIGS. 3a and 3b show a comparison of a prior art high-voltage continuous waveform and the high-voltage waveform of the present invention and illustrates the effect of a 50% power turndown on both waveforms. The upper waveforms shown are full-power waveforms for a glass/stainless steel corona cell: a prior art continuous waveform 30 with a frequency of 2 KHz and a 100% duty cycle, and a single-cycle discontinuous waveform 32 of the method of the present invention with a PRR of 2 KHz and a 1/BPW of 4 KHZ (50% duty cycle). The lower waveforms are at 50% power, with the prior art continuous waveform 34 having a frequency of 1 KHz and a 100% duty cycle, and the single-cycle discontinuous waveform 36 having a PRR of 1 KHz and the same 1/BPW of 4 KHz as before, resulting in a reduced duty cycle of 25%. Note the roughness on the positive side of the prior art waveform which increases as its frequency is lowered, and in contrast, the smooth bipolar pulses of the present invention which remain absolutely constant in waveform when their repetition rate is decreased.

Figure 4:
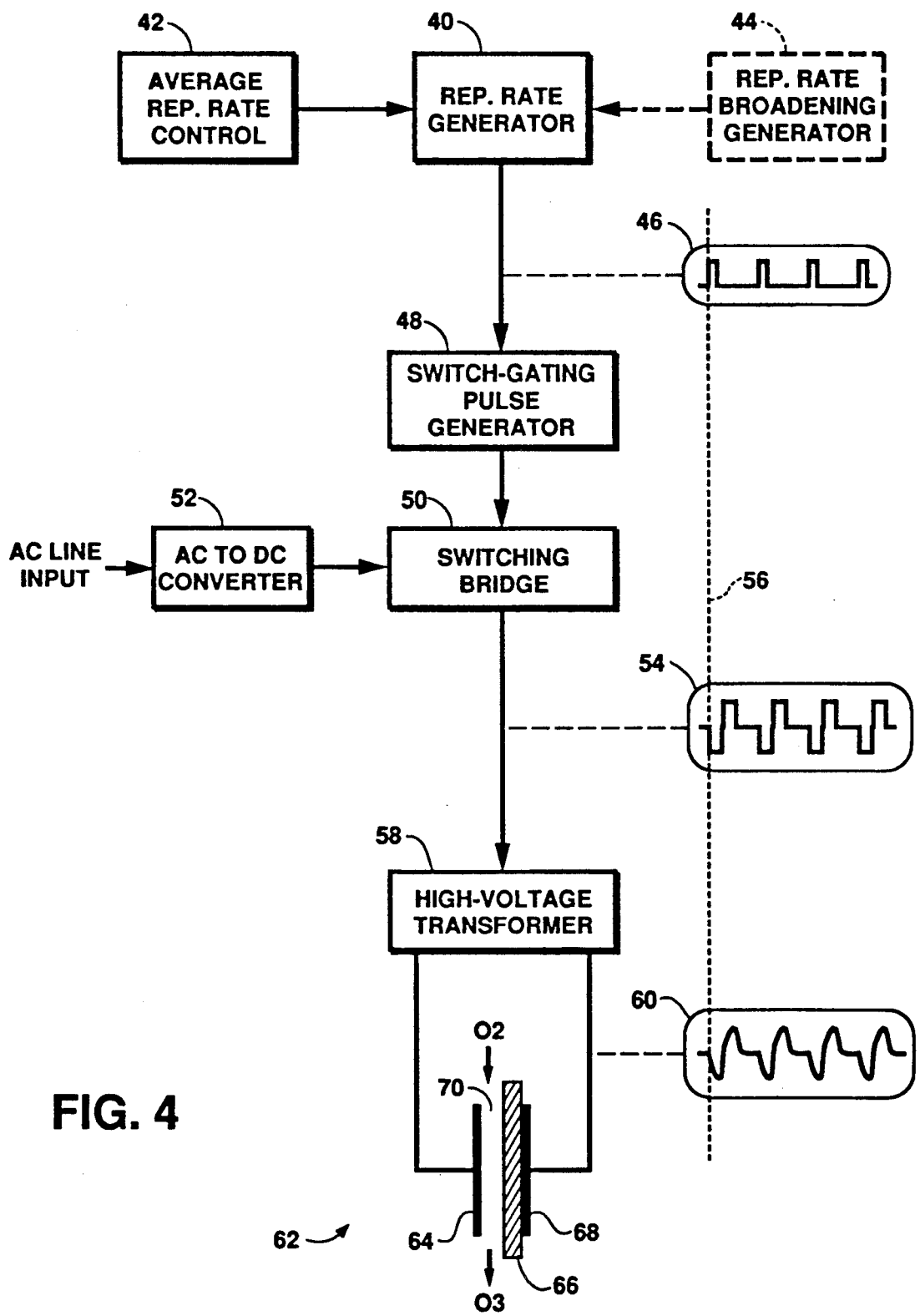
FIG. 4 is a block diagram of one possible power supply and corona cell implementing the method of the present invention, including illustrations of the waveforms produced.

FIG. 4 is a block diagram of one possible power supply and corona cell implementing the method of the present invention, and includes illustrations of the waveforms produced. The waveforms are shown without broadening. Repetition rate generator 40 receives an input from average repetition rate control 42 and optionally from repetition rate broadening generator 44 (40 and 44 could be combined into the same circuit). The repetition rate generator 40 feeds triggering pulses 46 into switch-gating pulse generator 48, which in turn feeds switch-gating pulses into switching bridge 50, causing a DC voltage from AC to DC converter 52 to be switched by power switching elements (e.g., mosfet or bipolar transistors) within switching bridge 50 into bipolar waveform 54 whose bipolar pulses initiate synchronously with triggering pulses 46 as shown by vertical dashed line 56. The bipolar waveform 54, which is identical to waveform 10 of FIG. 1a, drives high-voltage transformer 58. High-voltage transformer 58 produces a high-voltage output waveform 60 (identical to waveform 12 of FIG. 1a) which drives corona cell 62. The corona cell comprises a metal electrode 64, a glass dielectric 66, and a dielectric electrode 68. The high-voltage bipolar waveform 60, which is shown driving dielectric electrode 68 initially negative (which is the preferred polarity sequence of this invention when the corona cell is asymmetrical) induces a corona within gap 70 between metal electrode 64 and glass dielectric 66. This corona converts oxygen $O_2$ flowing through the gap into ozone $O_3$.

Figure 5:
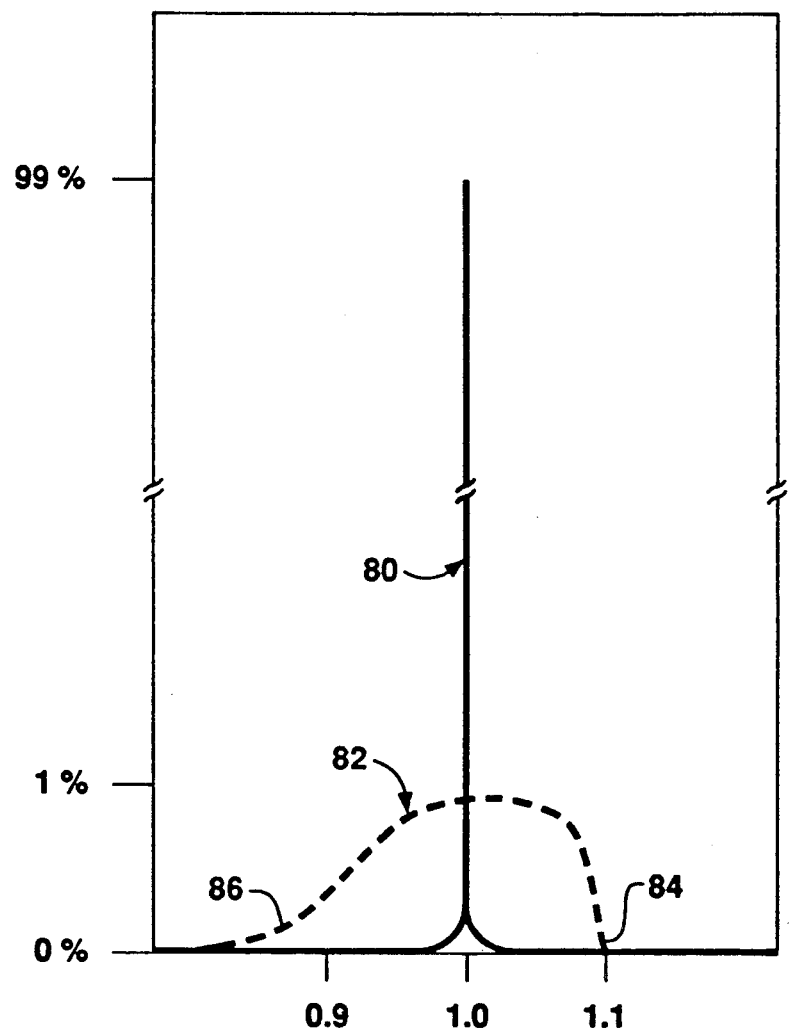
FIG. 5 illustrates the frequency distribution of an unbroadened and of a broadened bipolar pulse repetition rate.

FIG. 5 is a graph whose vertical axis represents percent of energy at each PRR frequency (for a frequency measurement bandwidth of about 1 Hz) and whose horizontal axis represents PRR in KHz. This graph contrasts the frequency spectrum of an unbroadened PRR (curve 80, solid line) having greater than 99% of its energy between 0.999 and 1.001 KHz, with the frequency spectrum of a pseudo-randomly jittered PRR (curve 82, dashed line) having less than 1% of its energy at any one frequency and having an average frequency of 1.0 KHz. Jittered PRR curve 82 has a sharp maximum frequency limit 84 (optionally accomplished by fixing a minimum dead time interval) to prevent the pulses from overlapping, and minimum frequency limiting 86 to prevent the PRR from being audibly irregular. The spectral envelope can have a flat or slightly curved plateau on top as in curve 82, or it could be bell-shaped. Instead of a sharp penetrating pitch or whine (curve 80), curve 82 produces a much softer, less noticeable sound resembling rushing wind or water. Thus the shrill "singing" of a transformer pulsed at high audio frequencies is converted into a soft "whoosh". This is not a masking of the original vibrations or sound, but rather a random broadening of their frequency spectrum. Reduction of audibility levels is of importance not only to make the industrial environment quieter in the case of large ozone generators, but also in small ozone generators in commercial and residential applications, particularly in swimming pools and spas.

When a single pure frequency is spread over a wide range of frequencies, the energy is much less likely to excite resonances or to cause structural fatigue in the relatively fragile dielectric material. In addition, there is less of a similar kind of stress on the transformer. Alternatively to or in addition to randomizing or-pseudo randomizing the PRR, we could also create a random or pseudo-random slight jitter in the BPW. This would preferably be done while keeping the areas of the adjacent unipolar pulses within each bipolar pulse equal to each other. Broadening of the PRR as described in this invention has no effect whatsoever on either the concentration or amount of ozone produced or the efficiency of ozone generation. The concentration of ozone generated by a broadened PRR (broadened over a reasonable range) of a particular average PRR value is identical to the concentration produced by the same unbroadened PRR. The average PRR is varied to control ozone output.

Random, pseudo-random, or repetitive-sweep broadening can be accomplished by a number of analog and/or digital means, the preferred random-type beginning with a source of random or pseudo-random electronic noise, supplied, for example, by the repetition rate broadening generator 44 of FIG. 4. Two possible broadening means are as follows:

1) White or pink noise is electronically generated, filtered and converted into a waveform suitable for driving the desired apparatus.

2) White or pink noise can be electronically filtered and clipped and superimposed onto a DC voltage which is employed, for example, to charge the timing capacitor of a timer such as a 555 integrated circuit. Thus the fundamental firing frequency of the timer (adjustably set by the DC voltage level) is jittered randomly within adjustable frequency excursion limits (set by the ratio of the noise amplitude to the DC voltage), resulting in a PRR with a randomized yet well-defined frequency distribution probability envelope tailored with absolute minimum and maximum possible pulse spacings (to prevent the PRR output pulses, and/or the pulses that they in turn will trigger, from overlapping, etc.), and shaped for minimum audibility. (If a pseudorandom generator with too short a repeat cycle, or if one or more interactive non-linear oscillators which can lock into discrete frequency bands are employed for the noise source, the desired acoustic smoothing effect may not be achieved, but instead a whole array of buzzing or regularly alternating tones can result.)

FIGS. 6a and 6b illustrate the use of a single master PRR generator to control two or more supplies. As is usual in switching-type power supplies, each pulse causes a current spike on the incoming AC power line. It is often desirable to operate more than one ozone power supply simultaneously on the same power line (or more than one pulse generating circuit and switching bridge from the same AC to DC converter). If the triggering pulses which feed the pulse generating circuits come from different sources, undesirable harmonic beating can occur between the frequencies of the various supplies periodically resulting in undesirably high superimposed current spikes. On the other hand, if the triggering pulses come directly from a single master PRR generator (which it is often desirable to use in order to allow simultaneous feedback control to all ozone generators from a single sensor or monitor), then all of the pulses will be in phase causing a very undesirable superimposition of all the current spikes on the power line. In order to avoid such problems, the present invention includes the optional use of a master PRR generator 90a, 90b which has an output with either an unbroadened or a broadened frequency distribution (shown as unbroadened outputs 92a and 92b in FIG. 6) and provides triggering pulses 46a, 46b to two or more different switch-gating pulse generators 48 through phase-shifting circuitry 94a or through sequential de-multiplexing circuitry 94b which split the output of the master generator into two or more outputs. Circuitry 94a and 94b function as anti-coincidence mechanisms which prevent the initiation of bipolar pulses in more than one switch-gating pulse generator at a time. Both circuitry means 94a and 94b distribute the current spikes on the AC power line over time, thereby preventing superimposed spikes and lowering the instantaneous current. In the case of phase-shifting means 94a, the output pulse trains are all generally identical to each other except for a phase shift, the incremental phase shift angle being approximately equal to 360 degrees divided by the number of supplies being driven. Phase-shifting circuitry means 94a could for example include a shift register optionally driven by the same clock that drives the master PRR generator. The phase-shift angle could optionally be jittered. In the case of the sequential de-multiplexing means 94b, the PRR of each output is equal to the repetition rate of the master generator divided by the number of outputs. One possible de-multiplexing sequence is illustrated by the labeling of pulses 92b and de-multiplexed output pulses 46b by the numbers 1 through 9 in order of their production. All supplies, that is all pulse generating circuit/switching bridge/high-voltage transformer combinations which are driven by the same master PRR generator, can either share one common AC to DC converter, or each can have its own converter.

Thus the waveform of the present invention provides the following benefits: (1) a much smaller, much less expensive transformer, (2) a smoother corona with less EMI and therefore more reliable operation of the electronics, (3) infinite adjustability of corona power, and (4) enough dead time between pulses to be able to broaden the frequency distribution of the pulse repetition rate and thus avoid the problems created when all the energy is concentrated at one frequency.

The waveform method of the present invention can include any ringing or other waveform which occurs at too low a voltage to excite significant amounts of corona and may appear between the main corona-producing pulses. Such lower-voltage waveforms may be present due to resonance properties of the system or might be desirable and purposefully included for the neutralization of corona space charge between bipolar pulses.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A method of powering corona discharge in ozone generators having a power supply including a high-voltage transformer, and having a corona discharge cell, said method comprising the steps of:
   providing said corona discharge cell with a single-cycle waveform input including bipolar pulses each comprising a pair of adjacent unipolar pulses of opposite polarity;
   separating each bipolar pulse from the next bipolar pulse by at time interval, with the width of said bipolar pulse and of said time interval providing a bipolar pulse repetition rate having a frequency distribution; and
   broadening said frequency distribution.

2. The method of powering corona discharge of claim 1 wherein said step of broadening said frequency distribution comprises:
   jittering said pulse repetition rate around an average value between approximately 30 and 3000 Hertz.

3. The method of powering corona discharge of claim 1 wherein said step of broadening said frequency distribution comprises:
   jittering said time interval in a generally random manner.

4. The method of powering corona discharge of claim 1 wherein said step of broadening said frequency distribution comprises:
   repetitive sweeping of the value of said time interval between two limits.

5. A method of powering corona discharge in ozone generators having a power supply including a high-voltage transformer, and having a corona discharge cell including a dielectric electrode and a metal electrode, said method comprising the steps of:
   providing said high-voltage transformer with a single-cycle waveform input including discrete bipolar pulses each consisting of a pair of adjacent unipolar pulses of opposite polarity, wherein the first unipolar pulse of each said bipolar pulse has a polarity such that the dielectric electrode is driven initially electronically negative relative to said metal electrode;

separating each bipolar pulse from the next bipolar pulse by a time interval, with the width of said bipolar pulse and of said time interval providing a bipolar pulse repetition rate having a frequency distribution; and broadening said frequency distribution.

6. The method of powering corona discharge of claim 5 further including the steps of:

limiting the duration of said adjacent unipolar pulses composing said bipolar pulses to between 20 and 2000 microseconds; and separating said adjacent unipolar pulses by a space of between 0.5 and 50 microseconds.

7. The method of powering corona discharge of claim 5 further including the step of:

setting said bipolar pulse repetition rate to a relatively constant value between 30 and 3000 Hertz.

8. The method of powering corona discharge of claim 5 wherein said step of broadening said frequency distribution comprises:

jittering said pulse repetition rate around an average value between approximately 30 and 3000 Hertz.

9. The method of powering corona discharge of claim 5 wherein said step of broadening said frequency distribution comprises:

jittering said time interval in a generally random manner.

10. The method of powering corona discharge of claim 5 wherein said step of broadening said frequency distribution comprises:

repetitive sweeping of the value of said time interval between two limits.

11. The method of powering corona discharge of claim 5 wherein said bipolar pulse width has a frequency distribution, said method further including the step of:

broadening said bipolar pulse width frequency distribution.

12. The method of powering corona discharge of claim 5 including the step of:

synchronously triggering the initiation of each bipolar pulse with a power supply repetition rate generator.

13. The method of powering corona discharge of claim 5 including the step of:

generating the duration of each said unipolar pulse and the duration of said space separating said adjacent unipolar pulses with a power supply switch-gating pulse generator.

14. The method of powering corona discharge of claim 5 including the step of:

providing a minimum limit on said time interval separating said bipolar pulses so that said bipolar pulses do not overlap.

15. The method of powering corona discharge of claim 5 including the steps of:

synchronously triggering the initiation of each bipolar pulse with a power supply repetition rate generator driving two or more switch-gating pulse generators; and preventing initiation of bipolar pulses in more than one switch-gating pulse generator at a time with a bipolar pulse anti-coincidence mechanism.

16. The method of powering corona discharge of claim 15 including the step of:

preventing initiation of bipolar pulses in more than one switch-gating pulse generator at a time with phase-shifting circuitry.

17. The method of powering corona discharge of claim 15 including the step of:

preventing initiation of bipolar pulses in more than one switch-gating pulse generator at a time with sequential de-multiplexing circuitry.

18. A method of powering corona discharge in ozone generators having a power supply including a high-voltage transformer, and having a corona discharge cell including a dielectric electrode and a metal electrode, said method comprising the steps of:

providing said dielectric electrode with a single-cycle waveform input including bipolar pulses each comprising a pair of adjacent unipolar pulses of opposite polarity, wherein the polarity sequence of said adjacent unipolar pulses is such that the first unipolar pulse of each said bipolar pulse drives said dielectric electrode initially electronically negative relative to said metal electrode;

separating each bipolar pulse from the next bipolar pulse by a time interval, with the width of said bipolar pulse and of said time interval providing a bipolar pulse repetition rate having a frequency distribution; and broadening said frequency distribution.

19. A method of powering corona discharge in ozone generators having a power supply including a high-voltage transformer, and having a corona discharge cell, said method comprising the steps of:

providing said high-voltage transformer with a single-cycle waveform input including bipolar pulses each comprising a pair of adjacent unipolar pulses of opposite polarity;

separating each bipolar pulse from the next bipolar pulse by a time interval, with the width of said bipolar pulse and of said time interval providing a bipolar pulse repetition rate having a frequency distribution; and broadening said frequency distribution.

20. A method of powering corona discharge in ozone generators having a power supply including a high-voltage transformer, and having a corona discharge cell including a dielectric electrode and a metal electrode, said method comprising the steps of:

providing said high-voltage transformer with a voltage waveform input including discrete bipolar pulses each consisting of first and second adjacent unipolar pulses of opposite polarity, wherein the sequence of pulse polarities is exclusively such that eh first unipolar pulse of each said bipolar pulse is invariably of the polarity that said dielectric electrode is driven initially electronically negative relative to said metal electrode;

separating said first and second unipolar pulses by a first time interval; and separating each bipolar pulse form the next bipolar pulse by a second time interval of longer duration that said first time interval, with the width of said bipolar pulse and of said second time interval providing a bipolar pulse repetition rate.

21. The method of powering corona discharge of claim 20 further including the steps of:

limiting the duration of said adjacent unipolar pulses composing said bipolar pulses to between 20 and 2000 microseconds; and separating said adjacent unipolar pulses by a space of between 0.5 and 50 microseconds.

22. The method of powering corona discharge of claim 20 further including the step of:

setting said bipolar pulse repetition rate to a relatively constant value between 30 and 3000 Hertz.

23. The method of powering corona discharge of claim 20 including the step of:

synchronously triggering the initiation of each bipolar pulse with a power supply repetition rate generator.

24. The method of powering corona discharge of claim 20 including the step of:

generating the duration of each said unipolar pulse and the duration of said space separating said adjacent unipolar pulses with a power supply switch-gating pulse generator.

25. The method of powering corona discharge of claim 20 including the steps of:

synchronously triggering the initiation of each bipolar pulse with a power supply repetition rate generator driving two or more switch-gating pulse generators; and preventing initiation of bipolar pulses in more than one switch-gating pulse generator at a time with a bipolar pulse anti-coincidence mechanism.

26. The method of powering corona discharge of claim 25 including the step of:

preventing initiation of bipolar pulses in more than one switch-gating pulse generator at a time with phase-shifting circuitry.

27. The method of powering corona discharge of claim 25 including the step of:

preventing initiation of bipolar pulses in more than one switch-gating pulse generator at a time with sequential de-multiplexing circuitry.

28. A method of powering corona discharge in ozone generators having a power supply including a high-voltage transformer, and having a corona discharge cell including a dielectric electrode and a metal electrode, said method comprising the steps of:

providing said corona discharge cell with a voltage waveform input including discrete bipolar pulses each consisting of first and second adjacent unipolar pulses of opposite polarity, wherein the sequence of pulse polarities is exclusively such that the first unipolar pulse of each said bipolar pulse is invariably of the polarity that said dielectric electrode is driven initially electronically negative relative to said metal electrode;

separating said first and second unipolar pulses by a first time interval; and separating each bipolar pulse from the next bipolar pulse by a second time interval of longer duration than said first time interval, with the width of said bipolar pulse and of said second time interval providing a bipolar pulse repetition rate.

* * * * *